United States Patent [19]

Graves et al.

[11] Patent Number: 4,555,339

[45] Date of Patent: Nov. 26, 1985

[54] COOKING GREASE COLLECTION POT

[76] Inventors: James E. Graves; Joan M. K. Graves, both of 312 Donax Ave., Imperial Beach, Calif. 92032

[21] Appl. No.: 557,617

[22] Filed: Dec. 2, 1983

[51] Int. Cl.[4] .................... B01D 35/00; B01D 35/28
[52] U.S. Cl. .................... 210/244; 220/4 C; 220/4 D
[58] Field of Search ............... 210/476, 474, 479, 464, 210/465, 470, 471, 239, 240, DIG. 8, 232, 244, 246, 469; D7/47, 79; 220/410, 4 C, 4 D, 408, 256, 288; 215/12 R

[56] References Cited

U.S. PATENT DOCUMENTS

| | | | |
|---|---|---|---|
| 22,999 | 2/1859 | Dutcher | 220/447 |
| 342,397 | 3/1886 | Smith | 62/319 |
| 485,011 | 10/1892 | Kneeland | 220/410 |
| 995,415 | 6/1911 | Steel | 210/244 |
| 1,948,771 | 2/1934 | Ruckee | 210/244 |
| 2,885,107 | 5/1959 | Bliss | 220/17 |
| 2,897,996 | 8/1959 | Billig et al. | 220/15 |
| 3,156,279 | 11/1964 | Grebowiec et al. | 150/0.5 |
| 3,275,180 | 9/1966 | Optner et al. | 220/17 |
| 3,670,916 | 6/1972 | Alpert | 220/410 |
| 3,707,241 | 12/1972 | Taylor | 220/288 |
| 3,980,117 | 9/1976 | Trombley | 150/52 |
| 4,066,557 | 1/1978 | Banoczi | 210/470 |

Primary Examiner—Richard V. Fisher
Assistant Examiner—Sharon T. Cohen
Attorney, Agent, or Firm—Brown, Martin & Haller

[57] ABSTRACT

A cooking grease collection pot includes inner and outer cylindrical containers. The inner container is made of a heat resistant plastic material and it includes an overlapping portion on which the lid is screwed so that the outer periphery of the lid can be grasped by hand in order to lift and remove the inner container. The inner container includes a screw-on lid and it is provided with a notch in its base for receiving a wedge that projects upwardly from the base of the outer container. The engagement between the notch and wedge prevents relative rotation of the containers to permit the lid for the inner container to be screwed on and off. The inner container may be removed for disposal and includes a strainer.

7 Claims, 3 Drawing Figures

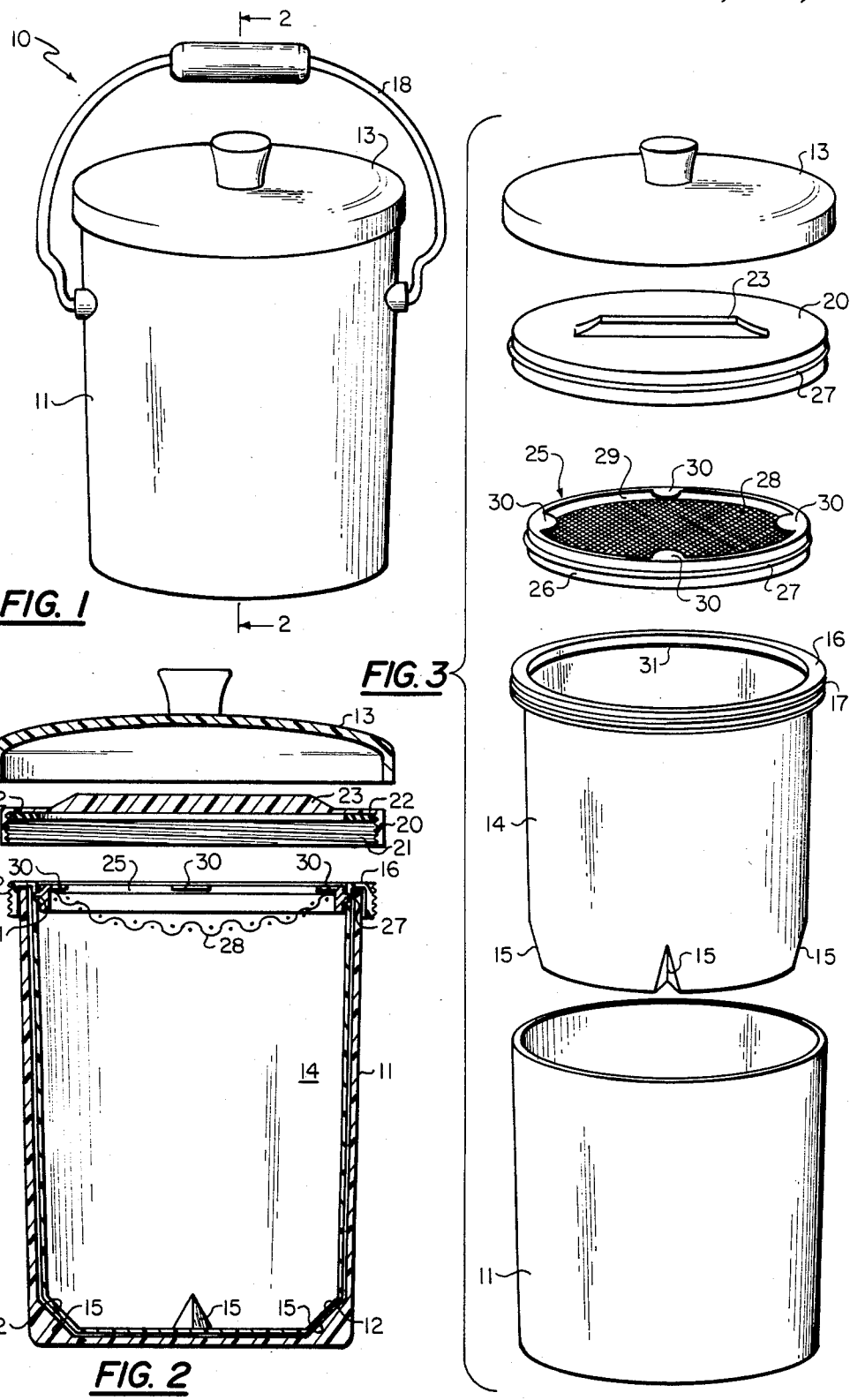

COOKING GREASE COLLECTION POT

BACKGROUND OF THE INVENTION

This invention relates to the collection and disposal of cooking grease.

Grease typically accumulates during the preparation of many types of food and at sometime during the preparation of a meal there arises a need to discard or store the accumulated cooking grease.

Pouring the grease into a plastic garbage bag is undesirable because of the odors and because the hot grease may break through the plastic bag. Pouring the grease down the sink is wasteful and may result in a stopped-up sink. Storing the grease in a jar is unsightly.

Therefore, it would be desirable to have a covered container for collecting the grease for later reuse or disposal. Also, an inexpensive container that could be discarded would be handy.

SUMMARY AND OBJECTS OF THE INVENTION

It is the primary object of the present invention to provide an improved container for collecting cooking grease.

In accordance with the primary aspect of the present invention, an inner container and lid combination composed of heat-resistant material capable of containing hot cooking grease without substantially deforming is conformably shaped and dimensioned to removably fit within an outer container. The inner container includes an overlapping portion that overlaps the upper rim of the outer container, and this overlapping portion includes means for enabling the lid to be screwed on so that the outer periphery of the lid can be grasped by hand in order to lift and remove the inner container. In one embodiment, the inner container has a notch in its base for receiving a wedge that projects upwardly from the base of the outer container to prevent relative rotation of the containers and permit the lid of the inner container to be screwed on and off. Another embodiment includes a strainer for the grease.

BRIEF DESCRIPTION OF THE DRAWING

The above and other objects and advantages of the present invention will become apparent from the detailed description when read in conjunction with the drawing wherein:

FIG. 1 is a perspective view of an exemplary embodiment of a cooking grease collection pot constructed in accordance with the present invention;

FIG. 2 is an enlarged sectional view taken on line 2—2 of FIG. 1; and

FIG. 3 is an assembly view of the illustrated embodiment.

DETAILED DESCRIPTION OF THE INVENTION

An exemplary embodiment of a cooking grease collection pot constructed in accordance with the principles of this invention is illustrated in the drawing. The pot is referred to generally in FIG. 1 by reference numeral 10, and it is shown in the assembly view of FIG. 3 to include outer container 11 and outer lid 13 which enclose inner container 14 and inner lid 20. The illustrated embodiment also includes strainer 25 which fits into the top of the inner container.

The outer container is preferably an upwardly opening two-quart cylindrical container composed of lightweight steel or other material such as is commonly employed in many kitchen containers. Other sizes, shapes and materials may be used for the outer container, such as a rectangularly-shaped glass or plastic container, for example.

The outer container functions as a receptacle for a removable inner container, and it serves to add strength and durability to the inner container while protecting a user from the high temperatures of hot cooking grease placed within. It also serves to keep the inner container and cooking grease out of view.

The outer container may employ a decorative outer finish that serves to distinguish it from other containers, and it may be labled as a further indication of the intended contents of the pot.

The outer container illustrating in FIG. 1 includes a pale-type handle 18 as a convenient means of carrying the pot, although other types of handles may be employed. The handle may be omitted altogether as illustrated in FIGS. 2 and 3.

Outer container 11 is provided with mating outer lid 13 which sits upon the pot and is large enough to cover both outer container 11 as well as inner container 14 and inner lid 20 contained within (FIG. 2). Outer lid 13 is composed of the same material as the outer container, although it need not be, and it may be omitted from the pot altogether without avoiding the inventive concepts herein disclosed.

The inner container 14 is also preferably an upwardly opening cylinder. Its outer diameter and height are slightly smaller than corresponding dimensions of the outer container 11.

Means for preventing the relative rotation of the outer and inner containers are provided. In the illustrated embodiment such means comprise four circumferentially spaced notch-engaging projections 12 which extend radially inward at the base of outer container 11 (FIG. 2). Each projection 12 serves to engage a mating notch 15 on inner container 14 to prevent relative rotation of the containers. The notch-engaging projections are wedge-shaped in the illustrated embodiment, and they may be moulded or otherwise formed within the outer container employing well known fabrication techniques and materials.

Preventing relative rotation of the containers serves to facilitate screwing the inner lid on the inner container. It is of particular concern in a pot such as that illustrated which employs cylindrically-shaped containers. The projections and mating notches may be omitted altogether in a rectangularly-shaped pot since the geometry of the containers serves to prevent relative rotation.

FIG. 2 illustrates notch-engaging projections 12 engaging notches 15 of the inner container to prevent relative rotation of the containers. In FIG. 2, the inner container also has lip 16, an overlapping portion overlapping and extending around the mouth or rim of the outer container, with the lip having exterior thread 17 for receiving screw-on inner lid 20. The lip also centers the upper end of the inner container within the outer container, and the threads serve with lip 16 as means for enabling the lid to be screwed on so that the outer periphery of the lid can be grasped by hand in order to lift and remove the inner container. The overlapping portion, lip 16, and the lid nestle over the outer container.

The inner container is composed of a heat-resistant plastic material, such as is commonly available and employed in a variety of heat-resistant containers, utensils and appliances, which is capable of containing hot cooking grease, including butter, cooking oil, bacon grease, lard, and the like, at cooking temperatures of approximately 300 to 400 degrees Fahrenheit, without substantially deforming. It is preferably fabricated using readily available and commonly known techniques and materials of sufficiently inexpensive cost to enhance use as a disposable item that can be discarded along with collected grease at a reasonable cost to the user. A glass, metal or ceramic inner container may also be employed.

Inner lid 20 is fabricated using the same techniques and materials as are used for the inner container. It has interior thread 21 that mates with exterior threads 17 on lip 16 to permit the inner lid to be screwed onto the lip of the inner container. Inner lid 20 includes a resilient gasket 22 on an inner surface of the lid, as illustrated in FIG. 2, to help seal the inner container when the lid is screwed on. Inner lid 20 also includes handle 23 (FIG. 3) for use in placement and rotation of the inner lid as well as for use in removing the inner container and lid combination from the outer container. The inner lid is shaped and dimensioned so that outer lid 13 may be set upon the pot to cover both the outer container as well as the inner container and lid combination.

The illustrated embodiment of the invention includes strainer 25 which fits within the inner container (FIGS. 2 and 3). It employs heat-resistant plastic materials similar to the material of which inner container 14 and inner lid 20 are composed, and it is conformably shaped to forceably fit within the mouth of the inner container. The strainer includes circular ring 26 having strainer screen 28 extending across the center of the ring. The circular ring includes circumferentially extending rib 27 about the periphery (FIG. 3). The rib serves to engage annular groove 31 (FIG. 3) in the interior wall of the inner container to effect a force fit of the strainer within the mouth of the inner container. The rib may deform slightly to allow for dimensional tolerances, and the strainer can be simply snapped in place in the inner container. Annular groove 31 may be omitted, with rib 27 dimensioned to simply bear upon an inner surface of the inner container. Alternatively, rib 27 can be shaped to conform to the shape of lip 16 to allow the strainer to be set upon lip 16.

Circular ring 26 includes upwardly-extending outer wall 29 as a means for retaining grease on the strainer without ever flowing. Also, strainer screen 28 has a downwardly concave shape to further retain the grease as illustrated in FIG. 2.

Strainer 25 is shaped and dimensioned to allow the inner lid to be screwed on with the strainer in place and it includes integrally-formed tabs 30 for gripping and removing the strainer (FIG. 3).

The illustrated embodiment of a cooking grease collection pot may be placed on the kitchen counter and remain available for collecting cooking grease as the grease accumulates. The strainer may be used as desired. The inner container and lid combination may be removed with the strainer and stored or discarded, and the outer container may be re-supplied with a fresh inner container, lid and strainer.

While the present invention has been illustrated and described by means of specific embodiments, it is to be understood that numerous changes and modifications may be made therein without departing from the spirit and scope of the invention as defined in the appended claims.

What is claimed is:

1. A cooking grease collection pot comprising:
   an outer upwardly opening container;
   an inner upwardly opening container conformably shaped and dimensioned to be received within the outer container, the inner container being made of a material with sufficient heat resistance to prevent substantial deformation when directly contacted by grease which has been heated to cooking temperatures;
   a lid for closing the opening of the inner container; and
   means for preventing relative rotation between the containers when the inner container is received within the outer container;
   wherein the outer container and the inner container are cylindrical, the outside diameter of the inner container is slightly smaller than the inside diameter of the outer container, and the rotation preventing means includes a plurality of circumferentially spaced, radially inwardly extending projections formed on an interior wall of the outer container, and a plurality of circumferentially spaced, radially inwardly extending notches formed on an exterior wall of the inner container each for receiving a corresponding projection when the inner container is inserted into the outer container.

2. A pot according to claim 1 wherein the inner container includes a lip which extends around and encloses the upper end of the outer container when the inner container is inserted into the outer container.

3. A pot according to claim 2 wherein the lip has exterior threads formed thereon and the lid has a circular wall with threads formed on an interior wall thereof so that the lid can be screwed on to the lip of the interior container.

4. A pot according to claim 1 further comprising a removable strainer including an annular ring and a layer of screen material attached to and covering the area enclosed by the ring, the ring having an annular rib formed on an exterior wall thereof and an outer diameter slightly smaller than the inner diameter of the upper end of the inner container so that the ring can be removably inserted into the upper end of the inner container with the annular rib snapping into an annular groove formed in the upper end of the interior container.

5. A pot according to claim 4 wherein the ring has an upwardly extending wall portion which extends above the screen layer for containing the grease and preventing overflow from the strainer as grease is poured thereon.

6. A pot according to claim 4 wherein the layer of screen material has a downwardly concave shape.

7. A pot according to claim 1 further comprising a lid for closing the upper end of the outer container when the inner container and inner lid are positioned within the outer container.

* * * * *